United States Patent [19]
Nishimura et al.

[11] Patent Number: 5,797,269
[45] Date of Patent: Aug. 25, 1998

[54] HYDROGEN STORAGE CONTAINERS

[75] Inventors: Kouichi Nishimura, Suita; Kouichi Satoh, Hirakata; Shin Fujitani, Hirakata; Ikuo Yonezu, Hirakata; Koji Nishio, Hirakata, all of Japan

[73] Assignee: Sanyo Electric Co., Ltd., Osaka, Japan

[21] Appl. No.: 804,334

[22] Filed: Feb. 21, 1997

[30] Foreign Application Priority Data

Feb. 23, 1996 [JP] Japan ................................. 8-036446
Feb. 29, 1996 [JP] Japan ................................. 8-042758

[51] Int. Cl.$^6$ ............................................... F17C 11/00
[52] U.S. Cl. ...................................................... 62/46.2
[58] Field of Search .................................. 62/45.1, 46.2

[56] References Cited

U.S. PATENT DOCUMENTS 4,928,496  5/1990  Wallace et al. .................... 62/46.2

FOREIGN PATENT DOCUMENTS 56-18521  4/1981  Japan.
4-36083   6/1992  Japan.
5-60423   3/1993  Japan.

OTHER PUBLICATIONS

"Metal Hydride Heat Pump"; D.A. Rohy et al.; Solar Turbines Incorporated, San Diego, CA 1982 IEEE.

*Primary Examiner*—Christopher Kilner
*Attorney, Agent, or Firm*—Armstrong, Westerman, Hattori, McLeland & Naughton

[57] ABSTRACT

Molded bodies of a hydrogen absorbing alloy accommodated in a hydrogen storage container are made readily replaceable to ensure stabilized supply of hydrogen gas. When exhibiting an impaired hydrogen absorbing-desorbing capacity, the molded bodies can be easily replaced by new molded bodies, whereby a specified hydrogen absorbing-desorbing capacity can be maintained. The hydrogen gas released from the storage container is partly utilized to heat the container and thereby maintain the alloy at a predetermined temperature, consequently assuring a device, such as a fuel cell, of stabilized supply of hydrogen from the container.

6 Claims, 17 Drawing Sheets

HYDROGEN STORAGE CONTAINERS

BACKGROUND OF THE INVENTION

1. Field of the Invention

The present invention relates to hydrogen storage containers for accommodating hydrogen absorbing alloys, and more particularly to hydrogen storage containers adapted for stabilized supply of hydrogen gas from a hydrogen absorbing alloy accommodated therein.

2. Background Art

Developed in recent years are devices, such as fuel cells, hydrogen motor vehicles and heat pumps, wherein the energy source is hydrogen gas. Hydrogen gas is supplied to these devices utilizing a hydrogen absorbing alloy which reversibly absorbs or desorbs hydrogen. The alloy is accommodated in the form of a powder or molded body in a specified container.

To give an increased hydrogen storage capacity to the container, it is desired that a larger quantity of hydrogen absorbing alloy be accommodated in the container. Instead of filling the container with the alloy in the form of a powder, therefore, the alloy is often accommodated in the container in the form of a molded body which is prepared from a mixture of alloy powder and a binder (e.g., PTFE) by compression molding and the subsequent sintering or like treatment and which is externally shaped in conformity with the interior configuration of the container.

For example, FIG. 26 shows a hydrogen storage container 90 for containing molded bodies 91 of hydrogen absorbing alloy. The container 90 comprises a tubular body 92 closed at one end, open at the other end and having a circular cross section, and a lid 93 closing the opening. The molded bodies 91 are placed into the container through the opening and accommodated therein as stacked up. After the molded bodies 91 have been accommodated, the opening is closed with the lid 93 attached to the tubular body 92, for example, with fastening members 94 such as bolts and nuts or by welding. The lid 93 has joined thereto piping 95 for releasing hydrogen gas, causing the container 90 to communicate with a fuel cell or like device therethrough.

With hydrogen storage containers, it is desirable that the hydrogen gas desorbed from the alloy be supplied to the device with good stability.

The hydrogen absorbing alloy becomes more finely divided with the absorption and desorption of hydrogen gas to exhibit a reduced hydrogen absorbing-desorbing capacity. Accordingly, there arises a need to replace the alloy within the container to ensure the desired hydrogen absorbing-desorbing capacity. With the container described, however, it is necessary for the replacement of the alloy to take out the alloy from the container by removing the tubular body from the lid and turning the body upside down, hence the drawback of requiring a time-consuming procedure. It is therefore practice to remove the piping from the device and replace the alloy as contained in the container.

The hydrogen absorbing alloy desorbs hydrogen gas through an endothermic reaction, so that the temperature of the alloy drops with the desorption of hydrogen gas, gradually decreasing the amount of hydrogen gas to be desorbed. In order to cause the alloy to desorb a sufficient amount of hydrogen gas with good stability, it is accordingly necessary to heat the alloy to some extent and preclude the drop in the temperature.

A container is available which is internally provided with heat transfer fins for heat exchange and thereby adapted to control the temperature of the alloy to overcome the problem of temperature reduction (see, for example, JP-B-36081/1992). As shown in FIG. 27, a device is also available which comprises a heat medium tube 96 inserted in a container 90 through a wall thereof, and an external heat source 98 operable by electricity, gas or other external energy source for heating a heat medium to pass the heated medium through the tube 96 and raise the temperature of a hydrogen absorbing alloy. Nevertheless, since the fuel cell, hydrogen motor vehicle or the like utilizing hydrogen gas as its energy source is used generally at a location where an external power source, gas or other energy source is not readily available, it is difficult to heat the alloy by the external heat source.

Additionally, when internally provided with the heat transfer fins or the heat medium tube 96 as stated above, the container 90 can be packed with a powder 97 of hydrogen absorbing alloy, but encounters difficulty in accommodating a molded body of hydrogen absorbing alloy, therefore has the drawback of a reduced hydrogen storage capacity and is further likely to rupture owing to the swelling of the alloy due to the absorption and desorption of hydrogen.

SUMMARY OF THE INVENTION

An object of the present invention is to provide an improved container for accommodating a hydrogen absorbing alloy as will be described below so as to ensure stabilized supply of hydrogen gas.

Another object of the invention is to facilitate the replacement of molded bodies of a hydrogen absorbing alloy accommodated in a hydrogen storage container and to thereby ensure stabilized supply of hydrogen gas. When the hydrogen absorbing-desorbing capacity of the molded bodies have been impaired, the deteriorated molded bodies can be taken out and readily replaced by new molded bodies to maintain a predetermined hydrogen absorbing-desorbing capacity.

Stated more specifically, the invention provides a hydrogen storage container for accommodating a plurality of molded bodies of a hydrogen absorbing alloy each having planar faces and arranged as opposed to one another face-to-face, the container being dividable into a first segment and a second segment to provide an opening so that the molded bodies can be placed into or taken out of the container through the opening by being moved in a direction parallel to their planar faces.

The molded bodies can be replaced by moving one of the first and second segments away from the other to divide the container, moving the molded bodies in the direction parallel to their faces to take out the molded bodies through the opening and placing new molded bodies into the container. After the replacement, the opening is closed by fitting the opening side of the first segment and the opening side of the second segment to each other and fastening the first segment and the second segment to each other with fastening members such as bolts and nuts.

According to the invention, the container is openable into divided segments, so that the molded bodies of hydrogen absorbing alloy can be placed into and taken out of the container easily. This eliminates the need to replace the alloy as accommodated in the container or to turn the container upside down to take out the molded bodies when there arises a need to replace the molded bodies owing to the deterioration of the bodies, consequently ensuring the replacement of the molded bodies with an improved efficiency. The container further has the advantage that the molded bodies can be replaced without removing the hydrogen gas piping from a device.

When required, heat transfer fins can be provided in the interior of the container in parallel to the planar faces of the molded bodies to be accommodated to assure the hydrogen absorbing alloy of an improved heat transfer efficiency. When so constructed, the container can be provided in its interior with the heat transfer fins for heat exchange and is yet adapted to accommodate the molded bodies therein, consequently enabling the alloy to exhibit improved hydrogen absorbing-desorbing characteristics.

Another object of the present invention is to provide a hydrogen storage container which is adapted to be heated with a portion of the hydrogen gas to be released from the container to thereby maintain a hydrogen absorbing alloy therein at a predetermined temperature, whereby the hydrogen stored in the container can be supplied to a fuel cell or like device with good stability.

More specifically, the present invention provides a hydrogen storage container filled with a hydrogen absorbing alloy in its interior and having hydrogen gas release piping connected to a wall thereof, a heater comprising a catalyst and being disposed on a wall of the container or in the vicinity thereof. The heater is in communication with the container via a hydrogen channel. The hydrogen gas desorbed from the alloy in the container is partly supplied to the heater through the hydrogen channel and catalytically burned within the heater to heat the alloy in the container. Preferably, the hydrogen channel is provided as branched out from hydrogen piping communicating with a device.

An example of catalyst usable comprises Pt (platinum) supported on a substrate of honeycomb structure. When the hydrogen gas comes into contact with the Pt on passing through the honeycomb structure, so-called catalytic combustion takes place in the presence of air, heating the alloy with the resulting heat of combustion.

With the hydrogen storage container of the present invention, the hydrogen absorbing alloy accommodated in the container is heated, whereby an increased amount of hydrogen gas can be desorbed from the alloy with good stability. The invention requires no external heat source since the alloy is heated utilizing a portion of the hydrogen gas desorbed from the alloy in the container. Further because the alloy in the interior of the container can be heated, it becomes possible to use a hydrogen absorbing alloy, such as $LaNi_{4.8}Mn_{0.2}$, which was conventionally difficult to use because of low equilibrium hydrogen pressure. The use of the hydrogen absorbing alloy of low equilibrium hydrogen pressure entails the advantage that the container can be of reduced wall thickness since the pressure to be exerted on the container during the absorption and desportion of hydrogen gas is then lower.

If hydrogen gas is supplied from the container to the heater for catalytic combustion before use to preheat the hydrogen absorbing alloy, hydrogen gas can be supplied, for example, to a fuel cell with good stability from the start of operation even at a low temperature.

Preferably, the hydrogen storage container including the heater of the construction described further comprises a temperature sensor, a valve provided for the hydrogen channel for opening and closing the channel, and a control unit connected to the temperature sensor for controlling the operation of the valve. The valve is opened or closed according to the temperature detected by the sensor to control the rate of supply of the hydrogen gas to be catalytically burned within the heater and thereby maintain the temperature of the hydrogen absorbing alloy at a predetermined level, thus ensuring stabilized supply of hydrogen gas.

More specifically, the valve is opened for the supply of hydrogen gas to the heater for catalytic combustion when the temperature of the alloy detected by the sensor is lower than the predetermined level. The heat of combustion is transferred to the alloy through the wall of the container to raise the temperature of the alloy. If the temperature detected by the sensor is higher than the predetermined level, on the other hand, the valve is closed to discontinue the supply of gas to the heater.

In the case where it is desired to control the temperature more finely, a valve the degree of opening of which is adjustable is used. When the temperature of the alloy detected by the sensor is lower than the predetermined level, the hydrogen gas is supplied to the heater at a higher rate by increasing the degree of opening of the valve, whereas if the temperature detected by the sensor is higher than the predetermined level, the valve opening degree is decreased to reduce the rate of supply of the hydrogen gas to the heater.

Controlling the valve in this way results in efficient combustion of the hydrogen gas within the heater to assure stabilized supply of hydrogen gas to the device.

BRIEF DESCRIPTION OF THE DRAWINGS

FIG. 15 is a graph showing the relationship between the hydrogen desorption time and the alloy temperature in Embodiment 4a;

FIG. 16 is a graph showing the relationship between the hydrogen desorption time and the container internal pressure in Embodiment 4a;

FIG. 17 is a graph showing the relationship between the hydrogen desorption time and the hydrogen flow rate in Embodiment 4a;

DESCRIPTION OF THE PREFERRED EMBODIMENTS

Embodiment 1

Figure 1:
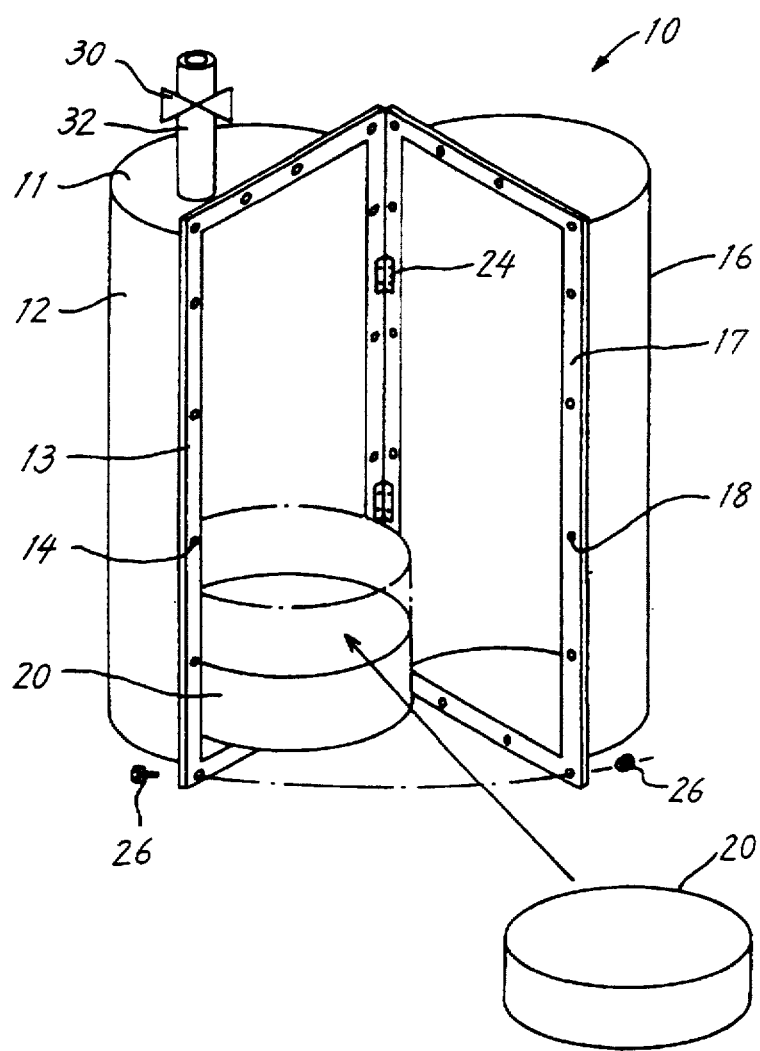
FIG. 1 is a perspective view showing Embodiment 1 of hydrogen storage container.

FIG. 1 shows a hydrogen storage container 10 in the form of a tubular body having a circular cross section for use in an upright position. The container is made, for example, of stainless steel and measures 400 mm in outside diameter, 380 mm in inside diameter and 600 mm in length.

The container 10 is divided into a first segment 12 and a second segment 16 so as to form an opening in a plane containing the central axis of the tubular body. While molded bodies 20 of a hydrogen absorbing alloy, each having parallel planar faces, are accommodated as stacked up in the container 10, the container 10 is thus divided so that the largest diameter portion of each molded body can be passed through the opening when the molded body is taken out by being moved in a direction parallel to the planar faces.

A container in the form of a tubular body of elliptical cross section is also useful insofar as an opening can be formed in a plane containing the central axis of the tubular body like the above container.

The first segment 12 is formed along the peripheral edge defining its opening with a flange 13 projecting outward, and a similar flange 17 is formed along the opening-defining peripheral edge of the second segment 16. The first segment 12 and the second segment 16 may be completely separated, or opposed side portions of the flanges 13, 17 may be pivotably connected together by hinges 24 as illustrated. Each of the flanges 13, 17 are formed with a plurality of through holes 14 or 18 as opposed to the corresponding holes 18 or 14 of the other flange. The container is formed by fastening the flanges 13, 17 together with fastening members 26 such as bolts and nuts. A seal member (not shown) is provided between the flanges 13, 17 for preventing hydrogen gas from leaking.

The container 10 has a top wall 11 with one end of piping 30 connected thereto for passing the hydrogen gas desorbed from the hydrogen absorbing alloy. The other end of the piping 30 is connected to a device such as fuel cell. The piping 30 is provided at an intermediate portion thereof with a stop valve 32, which is opened or closed for releasing the hydrogen gas to the fuel cell or like device or stopping the gas.

The molded bodies 10 to be accommodated are each in the form of a disk or solid cylinder having a diameter slightly larger than the inside diameter of the container and parallel planar opposite end faces.

The molded bodies 10 can be accommodated in the tubular container by the following procedure. The outside diameter of each molded body is slightly smaller than the inside diameter of the container, so that when the molded body 10 is pushed into the first segment 12 to a position where the body comes into contact with the inner peripheral surface thereof, the center of gravity of the molded body 10 is positioned within the first segment 12, permitting the molded body 10 to be placed in the first segment 12 without slipping off. After the desired number of molded bodies have been placed into the first segment 12 by stacking up the bodies one by one therein, the opening side of the second segment 16 is fitted to the opening side of the first segment 12, and the first and second segments 12, 16 are fastened together with bolts and nuts or like fastening members 26. To render the container openable, it is undesirable to fixedly join the first and second segments by welding.

The molded bodies are taken out by a procedure reserve to the above. More specifically, the first segment 12 and the second segment 16 are moved away from each other after removing the fastening members 26, and the molded bodies are moved one by one in a direction parallel to their planar faces and thereby taken out.

New molded bodies are thereafter accommodated in the same manner as above, and the opening sides of the first and second segments 12, 16 are fastened together with the fastening members 26, whereby the replacement of molded bodies is completed.

Embodiment 2

Figure 2:
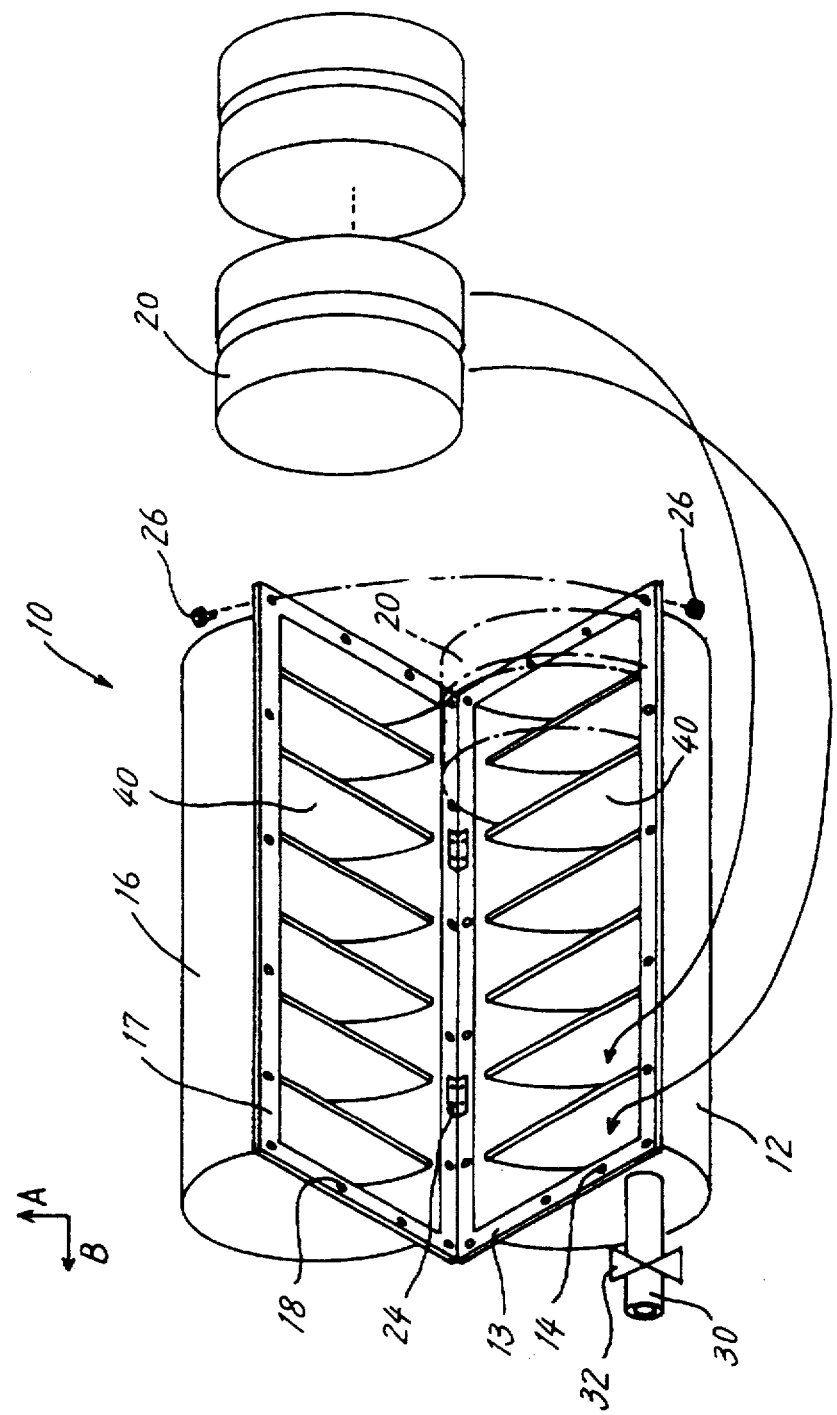
FIG. 2 is a perspective view showing Embodiment 2 of hydrogen storage container.

FIG. 2 shows a hydrogen storage container 10 in the form of a tubular body of circular cross section and having heat transfer fins 40 for use in a horizontal position. In the following description, the direction of arrow A in FIG. 2 will be referred to as "upper," and the direction of arrow B as "left."

The container 10 is divided into a lower first segment 12 and an upper second segment 16 along a plane (hereinafter referred to as the "central plane") perpendicular to the up-down direction and containing the axis of the container.

Each of the first segment 12 and the second segment 16 is formed with heat transfer fins 40 extending from the inner wall thereof in a direction perpendicular to the central plane. The fins 40 are arranged at a predetermined spacing in the right-left direction, and the fins in the upper segment are opposed to those in the lower segment in corresponding relation. When the first and second segments 12, 16 are fastened together, the opposed fins 40 in each pair define a clearance in the vicinity of the central plane. The hydrogen gas desorbed from a hydrogen absorbing alloy passes through such clearances before flowing out into piping 30.

Figure 3:
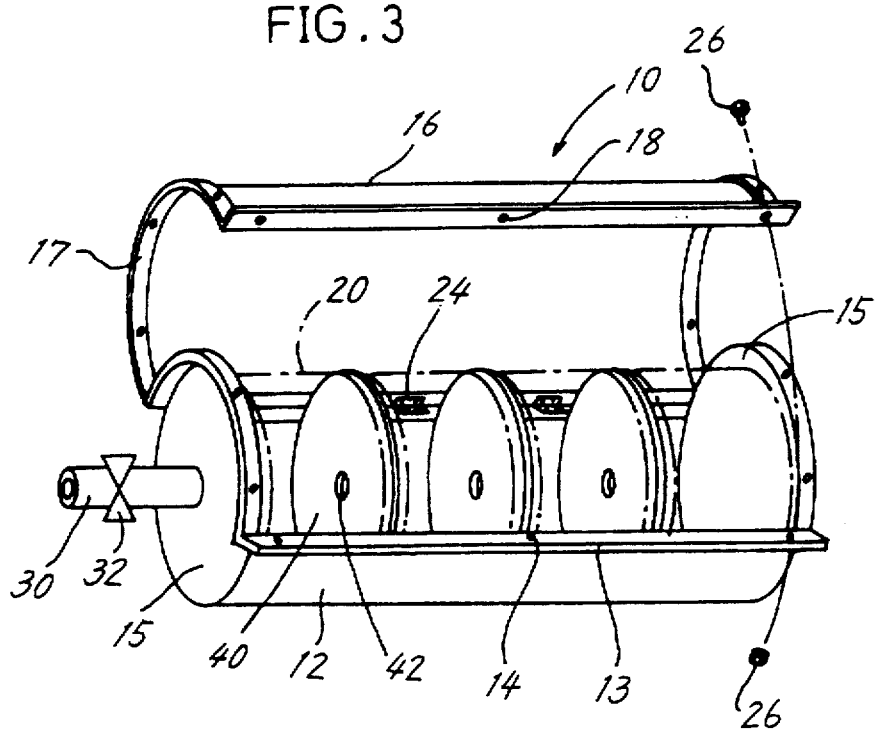
FIG. 3 is a perspective view showing a hydrogen storage container as a modification of Embodiment 2.

FIG. 3 shows heat transfer fins 40 projecting only from the inner peripheral wall of the first segment 12 which is fixed. In this case, the fins 40 are each formed with an aperture 42 to provide a hydrogen gas passage.

The container may be internally provided with a suitable number of heat transfer fins 40 as required. The fins need not be provided when other means is resorted to for heat exchange, or when there is no need for heat exchange.

The first segment 12 of the container 10 can be fixed to a fuel cell or like device. If the base end of the piping 30 is connected to the first segment 12 with the other end connected to the fuel cell or like device in this case, the piping 30 need not be removed from the device for the replacement of molded bodies 20.

The molded bodies 20 are accommodated in the container 10 by rotating the second segment 16 relative to the first portion 12 to open the container 10, and placing the molded bodies 20 into spaces between the fins 40 in the first segment 12. The second segment 16 is thereafter rotated toward the first segment 12, through holes 18 of a flange 17 are positioned in register with respective through holes 14 of a flange 13, and the flanges 13, 17 are fastened together with fastening members 26 to close the container.

FIG. 3 shows a modification of the tubular container shown in FIG. 2. Opposite end walls 15, 15 are integral with the first segment 12, and the first segment 12 is dividable from the second segment 16 along the central plane. The second segment 16 is pivotably connected to the first segment 12. With this modification, the piping 30 for hydrogen gas can be attached to the center portion of one of the end walls 15 of the container.

Embodiment 3

FIGS. 4 to 7 show various examples of dividable containers 10 which are different in cross sectional shape. Any of these examples is formed with an opening having such a size that molded bodies, each having parallel planar faces, can be moved in a direction in parallel to the faces when the molded bodies are to be placed into or removed from the container.

The contour of the outer periphery of the molded body is shaped approximately in conformity with the cross sectional shape of the container. For use with a container of quadrilateral cross section, for example, the contour of the outer periphery of the molded body is approximately similar to the quadrilateral shape.

Figure 4A:
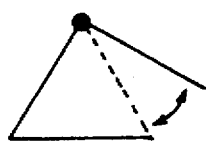
FIGS. 4A, 4B and 4C are cross sectional views showing examples of dividable containers having a triangular cross section.
Figure 4B:
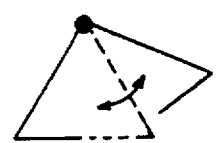
Figure 4C:
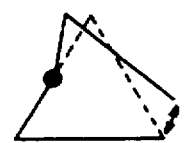

FIGS. 4A to 4C show examples of dividable containers having a triangular cross section.

Figure 5A:
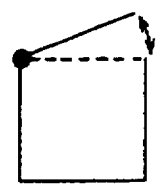
FIGS. 5A, 5B, 5C, 5D, 5E, 5F, 5G, 5H, 5I, 5J, 5K, 5L, 5M, 5N, 5O, 5P, 5Q and 5R are cross sectional views showing examples of dividable containers of quadrilateral cross section.
Figure 5B:
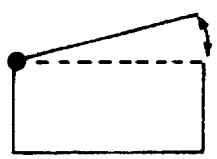
Figure 5C:
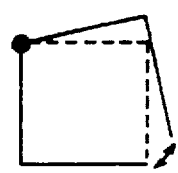
Figure 5D:
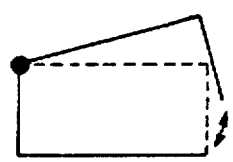
Figure 5E:
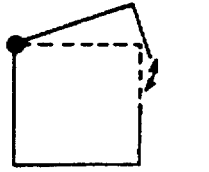
Figure 5F:
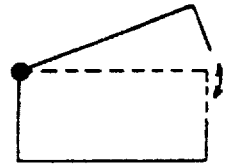
Figure 5G:
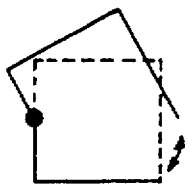
Figure 5H:
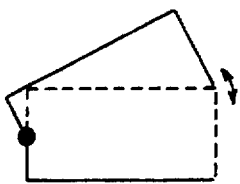
Figure 5I:
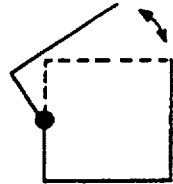
Figure 5J:
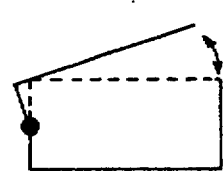
Figure 5K:
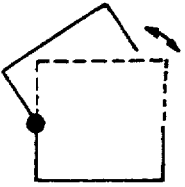
Figure 5L:
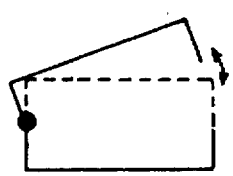
Figure 5M:
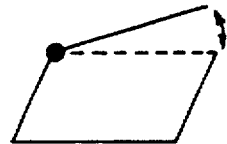
Figure 5N:
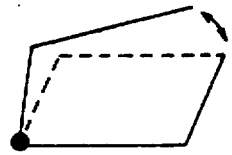
Figure 5O:
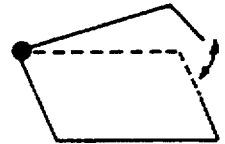
Figure 5P:
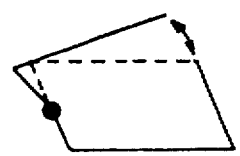
Figure 5Q:
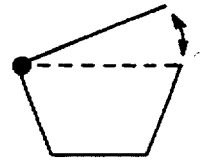
Figure 5R:
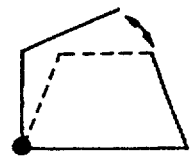

FIGS. 5A to 5R show examples of dividable containers having a quadrilateral cross section. Of these examples, the example shown in FIG. 5A is desirable.

Figure 6A:
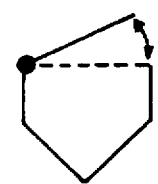
FIGS. 6A and 6B are cross sectional views showing examples of dividable containers of pentagonal cross section.
Figure 6B:
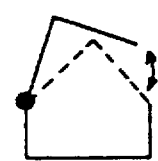

FIGS. 6A and 6B show examples of dividable containers having a pentagonal cross section.

Figure 7A:
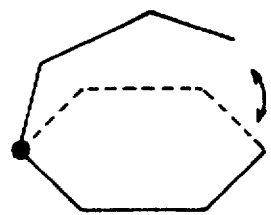
FIGS. 7A and 7B are cross sectional views showing examples of dividable containers of hexagonal cross section.
Figure 7B:
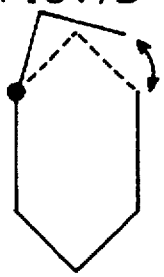

FIGS. 7A and 7B show examples of dividable containers having a hexagonal cross section. The example shown in FIG. 7A is the more preferable of the two.

With these examples, the first segment and the second segment are each formed with a flange along the peripheral edge thereof as in the case of the containers of circular cross section. One of the two segments may be made pivotally movable relative to the other as illustrate, or the two segments may be completely divided. Heat transfer fins can be provided in the interior of the container when so desired.

The shape and the size of the containers of the invention are not limited to those of the foregoing embodiment but are suitably determined. Accordingly, it should be understood that the above examples can also be modified variously into embodiments other than those illustrated, for example, according to the cross section of the container insofar as they have an opening through which molded bodies can be placed in or taken out by moving the bodies in a direction parallel to their planar faces.

Embodiment 4

An embodiment will be described below wherein a hydrogen storage container 10 is equipped with a heater 50.

Figure 8:
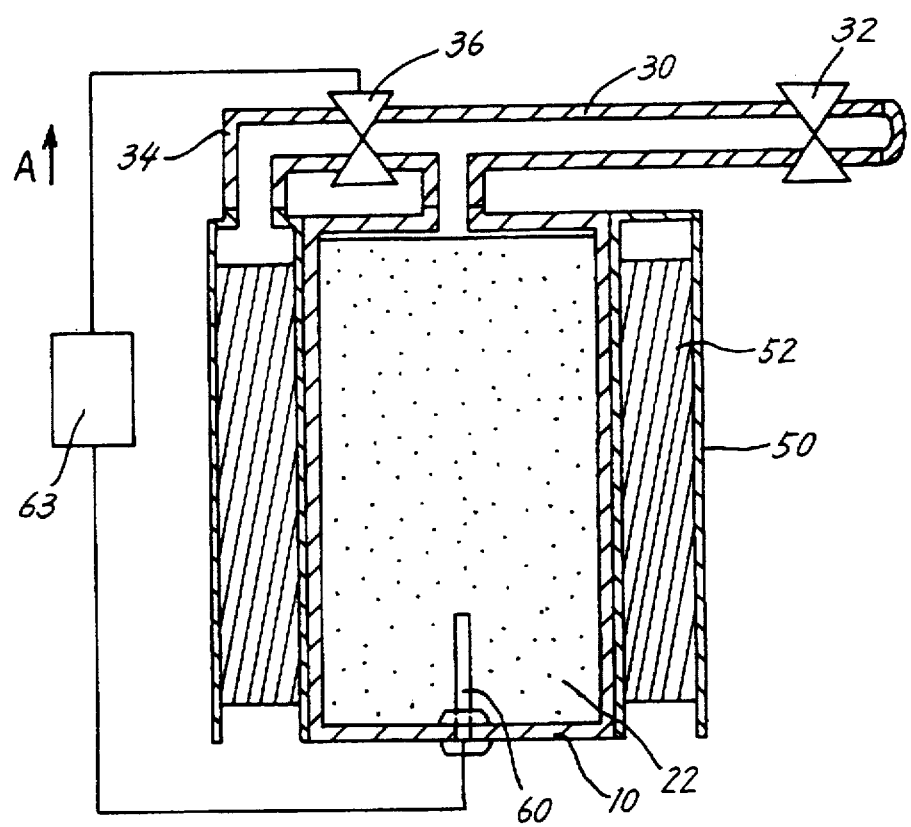
FIG. 8 is a sectional view showing Embodiment 4a, i.e., a hydrogen storage container packed with a hydrogen absorbing alloy powder.
Figure 9:
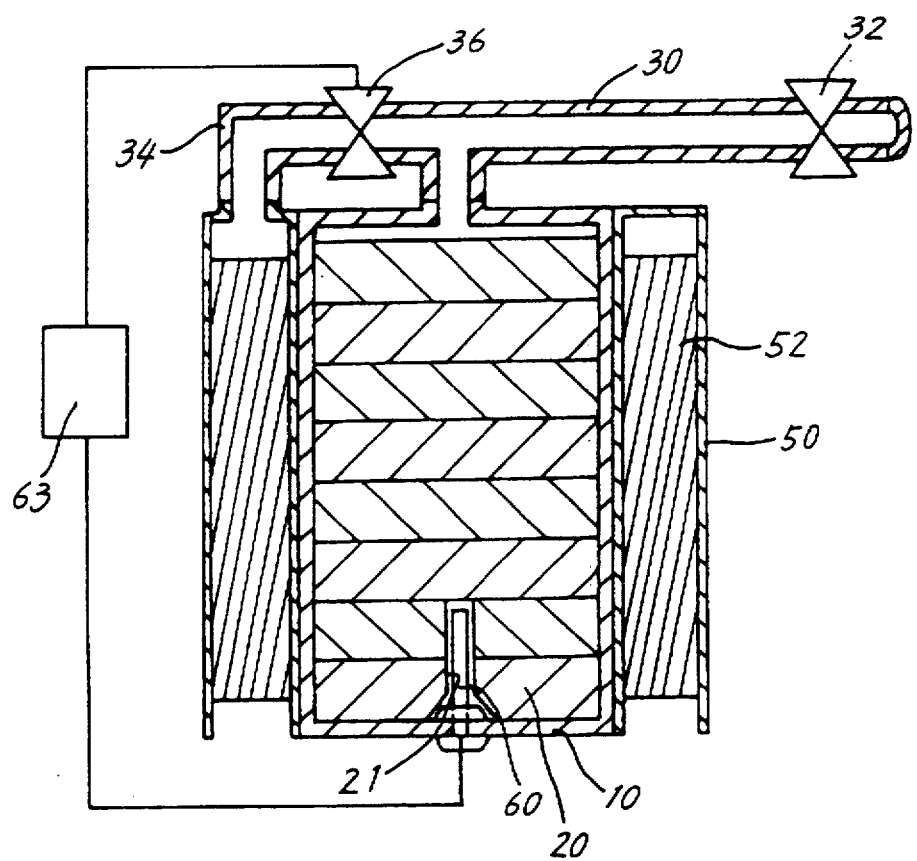
FIG. 9 is a sectional view showing Embodiment 4b, i.e., a hydrogen storage container equipped with a heater and having molded bodies of hydrogen absorbing alloy accommodated in the container.
Figure 10:
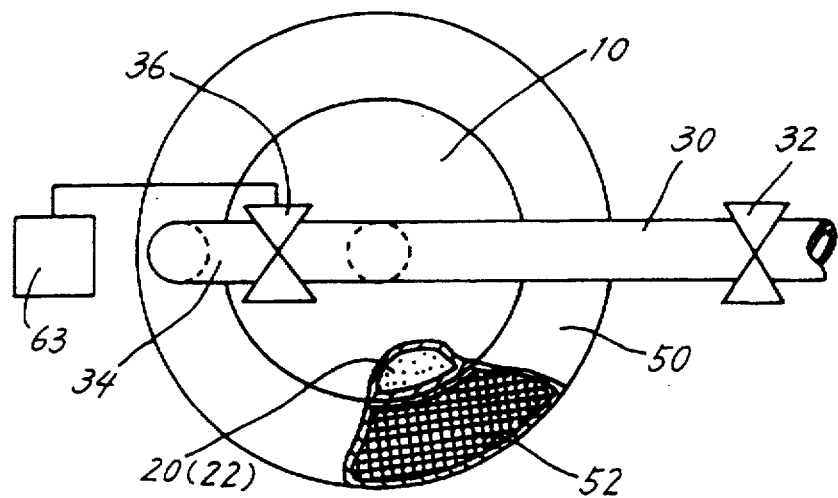
FIG. 10 is a plan view of the containers of FIGS. 8 and 9.

FIGS. 8 and 9 are sectional views showing hydrogen storage containers 10 each equipped with the heater 50. FIG. 10 is a view of the container 10 as seen from above. The container of FIG. 8 is packed with a hydrogen absorbing alloy powder 22, while molded bodies 20 are placed as stacked up in the container of FIG. 9. These containers will be described below for use in an upright position as illustrated in FIGS. 8 and 9 wherein the direction of arrows A is "upward," whereas the containers are usable also in a horizontal position.

Each of these containers 10 is made of stainless steel and has a top wall which has connected thereto one end of piping 30 for passing the hydrogen gas desorbed from hydrogen absorbing alloy. The other end of the piping 30 is connected to a device such as a fuel cell. A stop valve 32 mounted on an intermediate portion of the piping 30 is opened or closed for releasing the hydrogen gas to the device or stopping the gas.

The illustrated heater 50 has an annular structure made of stainless steel and having an open lower end, and is so disposed as to be in contact with the outer wall of the container 10 approximately over the entire circumference of the wall. A hydrogen channel 34 branching out from the piping 30 is connected to an upper portion of the heater 50 to hold the heater 50 in communication with the interior of the container 10. The hydrogen channel 34 may be separate from the piping 30 and connected directly to the container.

The heater 50 is open at its lower end so as to permit the air required for catalytic combustion to flow into the heater.

Although it is desirable that the heater 50 be in contact with the entire wall of the container to heat the hydrogen absorbing alloy within the container efficiently, the heater may be so provided as to be in contact with only a portion of the wall of the container or can be provided in the vicinity of the container wall.

Figure 11:
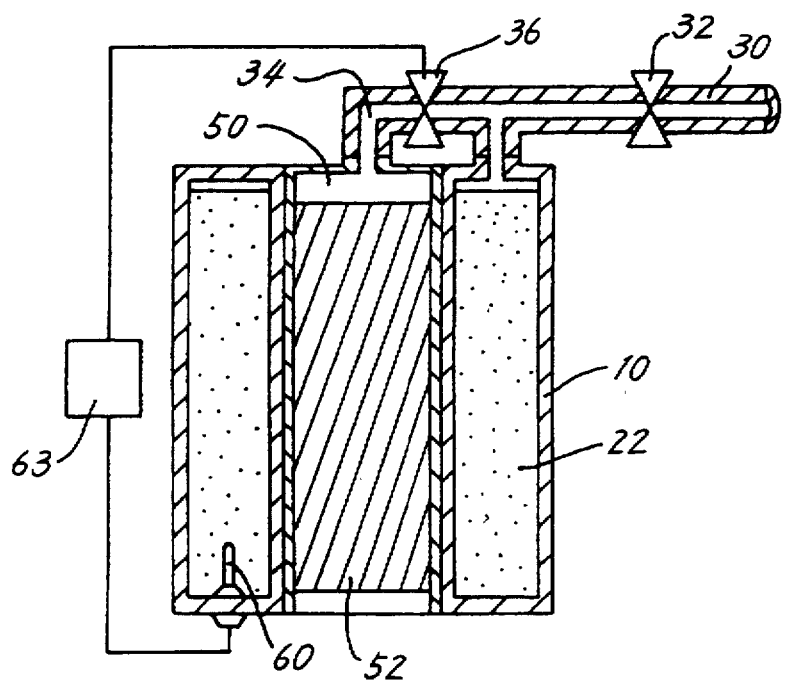
FIG. 11 is a sectional view showing a hydrogen storage container as a modification of Embodiment 4.

Alternatively, the heater 50 can be provided at the bottom of the container, whereas when the container is in the form of a tube of circular cross section or has a rectangular to square cross section, it is desired to provide the heater around the outer peripheral wall of the container to give an increased heating area. Alternatively, the container 10 can be of double-wall annular structure, with a heater 50 provided by the inner wall defining the central through bore of the container as seen in FIG. 11.

The interior of the heater 50 is preferably formed with a clearance at its top with a catalyst 52 provided below the clearance. The hydrogen gas desorbed from the hydrogen absorbing alloy partly flows into the heater 50 from the hydrogen channel 34, diffuses circumferentially of the heater in the clearance portion and is supplied to the catalyst 52. The hydrogen channel may be divided into a plurality of branches for connection to a plurality of portions of the heater so as to supply the hydrogen gas to the heater more uniformly.

The catalyst 52 to be used is, for example, one having a honeycomb structure and comprising γ—$Al_2O_3$ containing Pt (platinum) and supported on a substrate of $2MgO$—$2Al_2O_3$—$5SiO_2$. When the hydrogen gas comes into contact with the Pt upon passing through the honeycomb structure, so-called catalytic combustion occurs in the presence of air to heat the hydrogen absorbing alloy.

When the heater is provided with a fan (not shown) for supplying air, a large quantity of air can be supplied to the catalyst to achieve an improved catalytic combustion efficiency.

The hydrogen channel 34 is provided at an intermediate portion thereof with a valve 36, which is opened or closed to control the rate of supply of the hydrogen gas from the container 10 to the heater 50. Examples of useful valves 36 are a solenoid valve, thermal valve, piezoelectric valve, etc. The valve 36 is preferably variable in the degree of opening for finely controlling the flow rate, but can be a two-position valve which can be changed over between an open position and a closed position.

Preferably, the container 10 is provided with a temperature sensor 60 for detecting the temperature of the hydrogen absorbing alloy. As seen in FIGS. 8 and 9, the temperature sensor 10 is inserted into the container 10 through its bottom wall approximately centrally thereof for detecting the temperature of the alloy. In the case where molded bodies 21 are placed into the container, a hole 21 for passing the temperature sensor 60 therethrough is formed in some of the molded bodies 20 for fitting the sensor 60 into such holes 21.

Although it is desirable to dispose the temperature sensor 60 at a position where the temperature of the alloy is directly detectable, the sensor can alternatively be attached to the wall of the container to detect the temperature indirectly from the temperature of the container.

Electrically connected to the temperature sensor 60 and the valve 36 is a control unit 63 including a comparator, etc. for effecting feedback control.

The control unit 63 controls the operation of the valve 36 in the following manner.

Figure 12A:
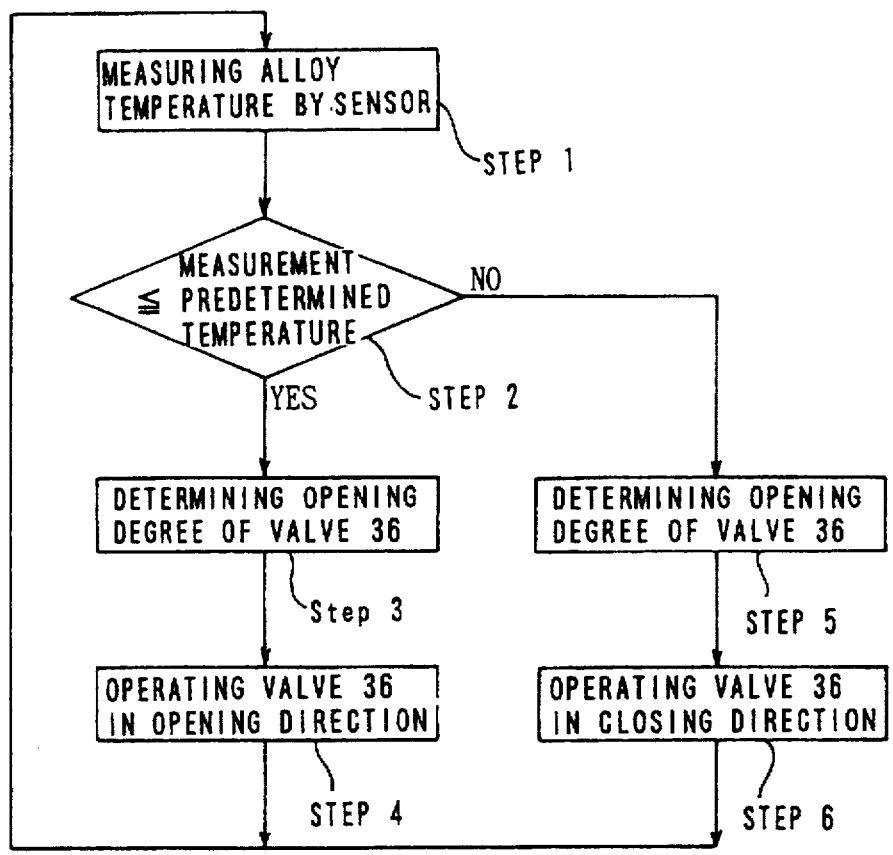
FIG. 12A is a flow chart for illustrating the operation of a valve.
Figure 12B:
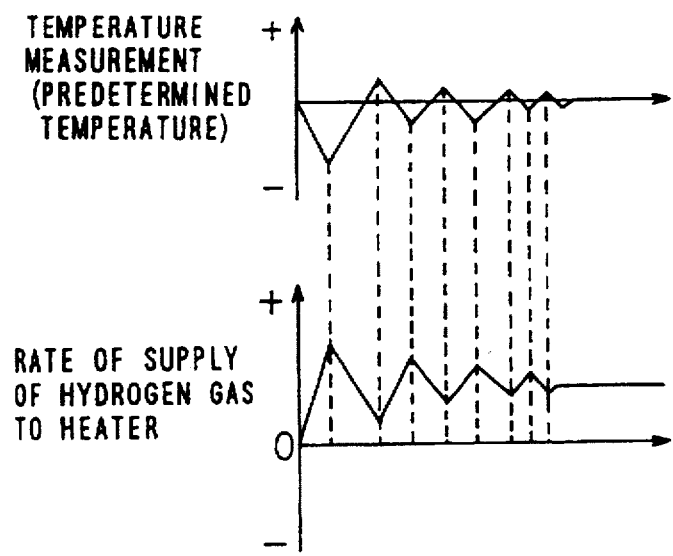
FIG. 12B is a diagram showing the relationship between the temperature measurement and the rate of supply of hydrogen gas to the heater.

With reference to FIG. 12A, the sensor 60 measures the temperature of the hydrogen absorbing alloy within the container (step 1). The resulting signal of temperature measurement is fed to the control unit 63, which checks the measurement as to whether it is at least a predetermined temperature (e.g., 25° C.) or lower than the predetermined temperature (step 2). When the temperature measurement is lower than the predetermined temperature, the degree of opening of the valve 36 is so determined that a greater amount of hydrogen gas is supplied to the heater 50 if the temperature difference is greater (step 3). The command of step 3 is sent to the valve 36, operating the valve toward an opening direction (step 4). When the temperature measurement is found to be not lower than the predetermined temperature in step 2, the opening degree of the valve 36 is so determined that if the temperature difference is greater, the rate of supply of the hydrogen gas is smaller (step 5). The command of step 5 is sent to the valve 36, operating the valve in a closing direction (step 6). FIG. 12B shows the relationship between the measurement obtained by the sensor 60 and the rate of supply of the hydrogen gas to the heater 50.

Figure 13A:
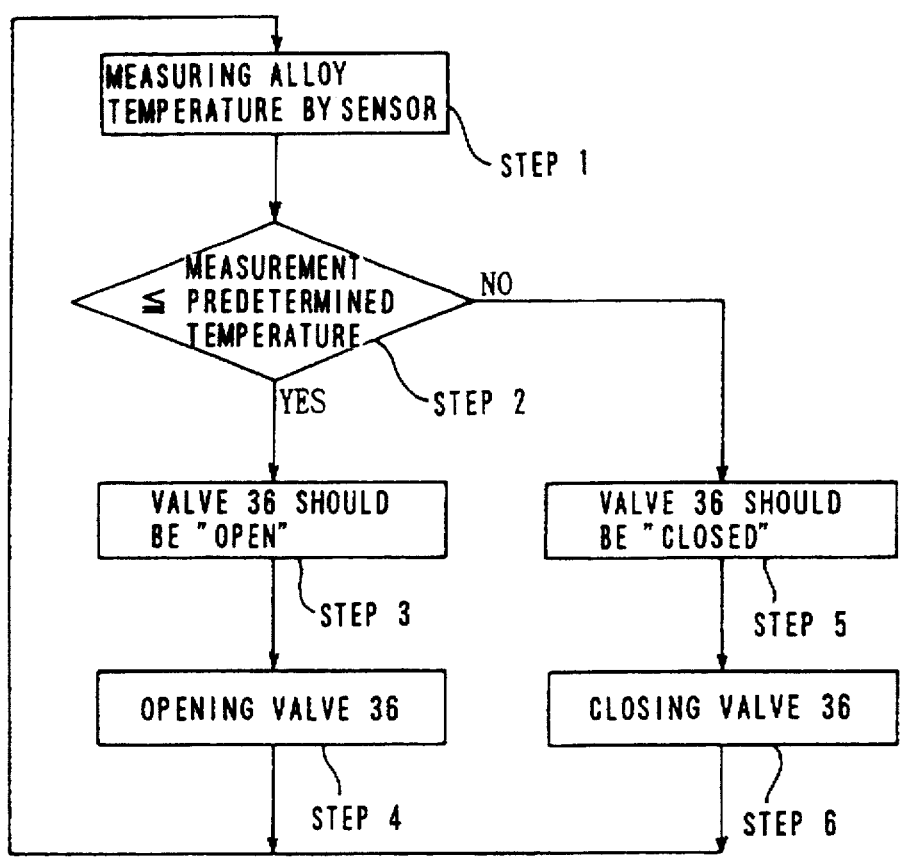
FIG. 13A is a flow chart for illustrating the operation of a valve.
Figure 13B:
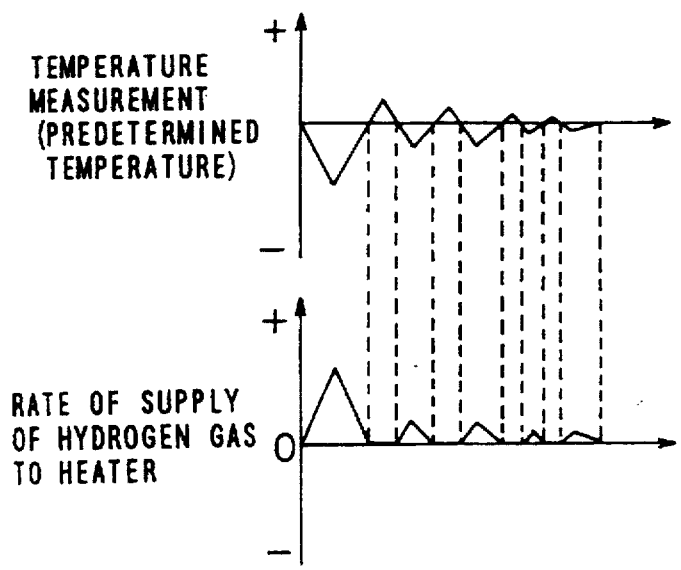
FIG. 13B is a diagram showing the relationship between the temperature measurement and the rate of supply of hydrogen gas to the heater.

In the case where the valve is a two-position valve adapted for a change-over from an open position to a closed position and vice versa, a decision that the valve 36 should be in the open position is made if the temperature measurement is lower than the predetermined temperature (step 3) as seen in FIG. 13A, followed by opening of the valve (step 4). When the measurement is not lower than the predetermined temperature, on the other than, a decision that the valve 36 should be in the closed position is made (step 5), and the valve is closed (step 6). FIG. 13B shows the relationship between the measurement obtained by the temperature sensor 60 and the rate of supply of the hydrogen gas to the heater 50.

When the temperature within the container rises, the hydrogen gas dissociation pressure of the alloy increases to result in an increased amount of hydrogen gas desorbed, whereas the endothermic reaction involved in the desorption of hydrogen gas lowers the temperature of the alloy. When the temperature drops below the predetermined temperature, a command from the control unit 63 opens the valve 36 for the supply of hydrogen gas to the heater 50. Catalytic combustion takes place in the heater, raising the internal temperature of the container 10 and increasing the temperature of the alloy again. In this way, the hydrogen absorbing alloy can be maintained within a specified temperature range during the desorption of hydrogen gas.

The control unit and the valve can be operated with use of a power source such as a dry cell.

The temperature of the hydrogen absorbing alloy within the container can be predetermined at an optimum value in conformity with the equilibrium characteristics of the particular alloy used. This makes it possible to use a hydrogen absorbing alloy, such as $LaNi_{4.8}Mn_{0.2}$, which is low in equilibrium hydrogen pressure. The use of the alloy having a low equilibrium hydrogen pressure leads to the advantage that the container can be of a reduced wall thickness.

If hydrogen gas is supplied to the heater 50 for catalytic combustion before using the hydrogen storage container 10 to preheat the hydrogen absorbing alloy, hydrogen gas can be supplied to a fuel cell or the like with good stability from the start of operation even at a low temperature.

Although the hydrogen gas released from the container is directly utilized for the heater, an unreacted gas resulting from the supply of the hydrogen gas from the container to the fuel cell or like device can be fed to the heater via a hydrogen channel to catalytically burn the hydrogen gas remaining in the unreacted gas.

Next, a description will be given of an embodiment wherein a container 10 is packed with a hydrogen absorbing alloy powder 22 (Embodiment 4a), and an embodiment wherein a container 10 is packed with molded bodies 20 (Embodiment 4b).

Embodiment 4a

According to this embodiment, the container 10 is filled with a powder of hydrogen absorbing alloy 22 as shown in FIG. 8.

Figure 14:
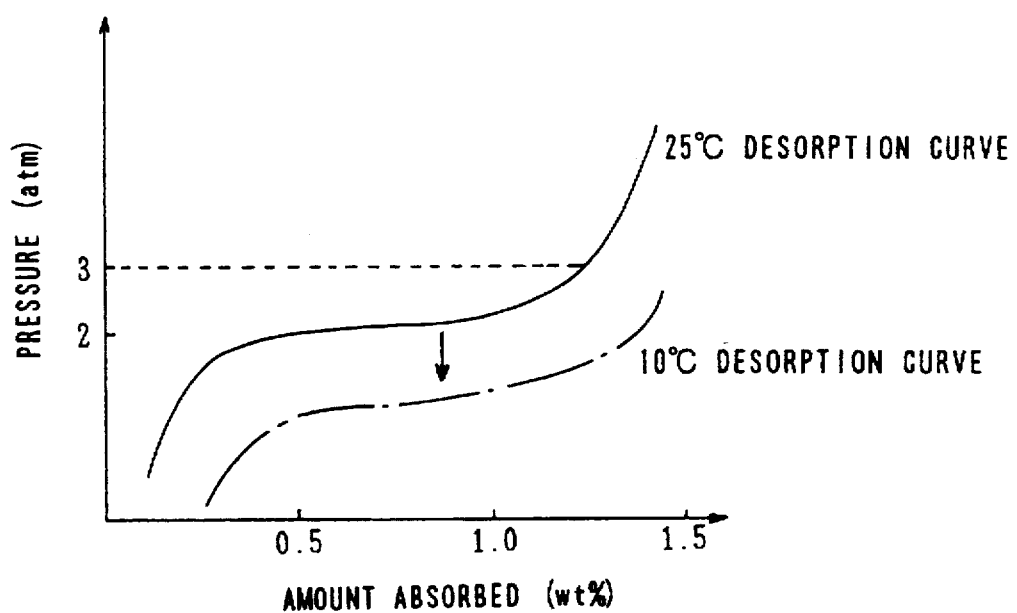
FIG. 14 is a graph showing the equilibrium characteristics of a hydrogen absorbing alloy.

The container 10 was packed with 830 g of powder of the hydrogen absorbing alloy $LaNi_{4.9}Al_{0.1}$. FIG. 14 shows the equilibrium characteristics of the alloy $LaNi_{4.9}Al_{0.1}$ at 25° C. and 10° C.

The hydrogen absorbing alloy within the container was first activated and caused to absorb hydrogen, followed by a hydrogen desorption experiment.

For activation, the container was exposed to hot air and thereby heated to about 60° C. for 2 hours while being evacuated. Subsequently, the interior of the container was pressurized with 9 $kg/cm^2$ of hydrogen gas for filling while exposing the container to cold air and cooling the alloy to cause the alloy to absorb the hydrogen gas. The absorption of hydrogen was completed on recognizing that 110 Nl of hydrogen gas had been absorbed by the alloy.

Figure 15:
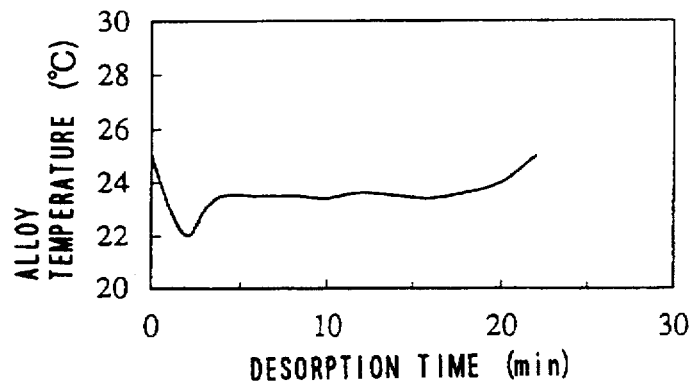
Figure 16:
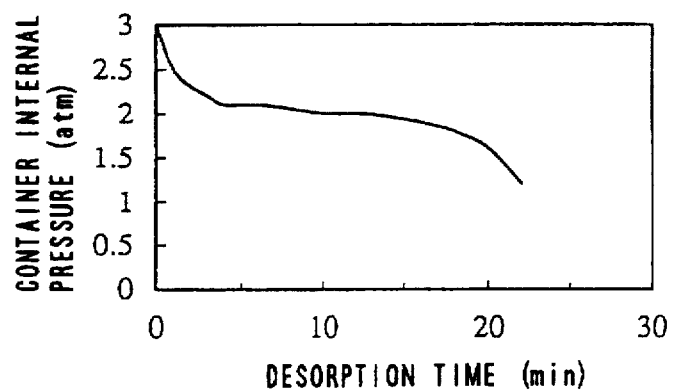
Figure 17:
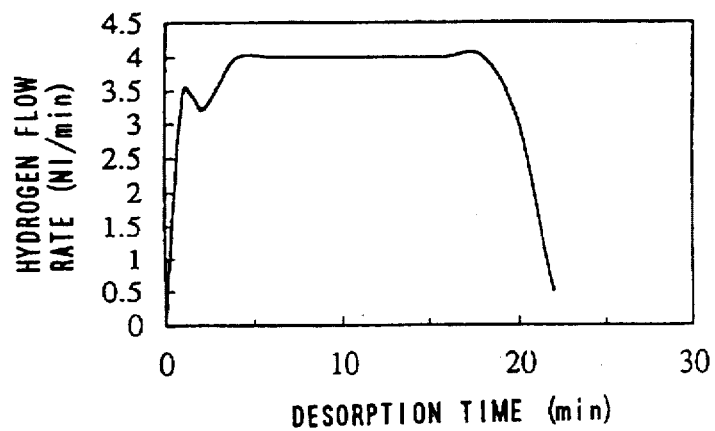

The alloy was allowed to desorb the absorbed hydrogen gas at atmospheric temperature of 25° C. The amount of hydrogen to be desorbed was so controlled that the hydrogen gas passed through the stop valve 32 at a rate of about 4 Nl/min, and the alloy temperature, container internal pressure and hydrogen flow rate were measured as related to the hydrogen desorption time. FIGS. 15 to 17 show the results.

Figure 18:
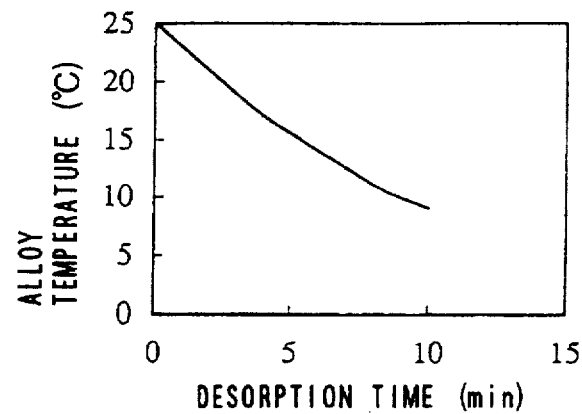
FIG. 18 is a graph showing the relationship between the hydrogen desorption time and the alloy temperature in a comparative example.
Figure 19:
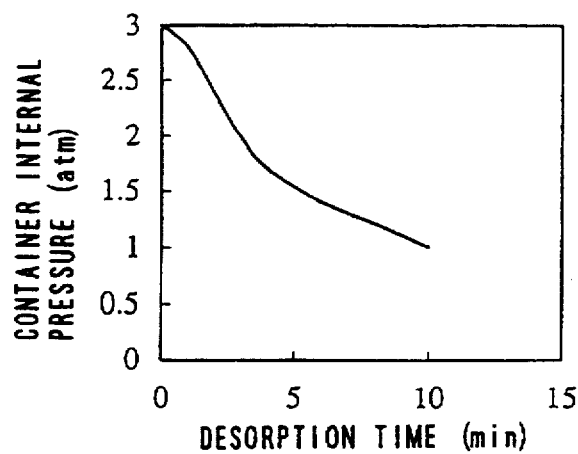
FIG. 19 is a graph showing the relationship between the hydrogen desorption time and the container internal pressure in the comparative example.
Figure 20:
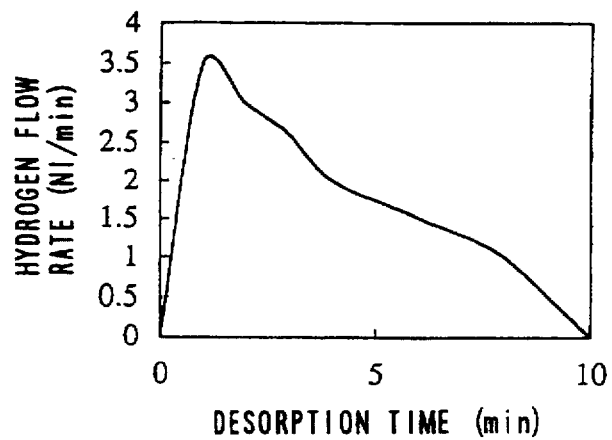
FIG. 20 is a graph showing the relationship between the hydrogen desorption time and the hydrogen flow rate in the comparative example.

For comparison, a container (hereinafter referred to as the "comparative container") equipped with no heater was similarly tested by experiment. FIGS. 18 to 20 show the results.

FIG. 15 reveals that the temperature of the hydrogen absorbing alloy in the container equipped with the heater (hereinafter referred to as the "container of the invention") drops in the initial stage of hydrogen gas desorption but thereafter remains at about 24° C. The alloy temperature remaining below the predetermined temperature of 25° C. is thought attributable to the fact that the alloy has a small heat transfer coefficient when in the form of a powder.

FIG. 18 shows that the temperature of the alloy in the comparative container drops nearly linearly with the desorption of hydrogen gas, decreasing to about 9° C. upon lapse of 10 minutes. This is attributable to the endothermic reaction involved in the desortion of hydrogen gas. The temperature drop downwardly shifts the hydrogen gas desorption curve of the equilibrium characteristics graph shown in FIG. 14 as indicated by a dot-and-dash curve, consequently entailing diminished desorption of hydrogen from the alloy.

With reference to FIG. 16, the internal pressure of the container of the invention remains at a level of about 2 atm until the lapse of about 20 minutes. The reason is that catalytic combustion within the container maintains the alloy at a constant temperature, permitting the alloy to desorb hydrogen gas with satisfactory stability.

In contrast, FIG. 19 indicates that the internal pressure of the comparative container decreases generally linearly with time, reducing to the level of atmospheric pressure (1 atom) upon lapse of about 10 minutes and becoming unable to further desorb hydrogen gas. This is due to a drop in the temperature of the alloy and to the resulting diminution of hydrogen gas desorption.

FIG. 17 showing the relationship between the hydrogen flow rate and the desorption time indicates that the container of the invention retains the predetermined initial value of about 4 Nl/min until the lapse of about 20 minutes because catalytic combustion within the container maintains the alloy at a constant temperature as stated above. The hydrogen flow rate decreased to about 0.5 Nl/min about 22 minutes later, whereupon the experiment was terminated.

With the comparative container, on the other hand, FIG. 20 shows that the hydrogen flow rate increases to a maximum of about 3.5 Nl/min upon lapse of about 1 minute, thereafter decreases generally linearly and reduces to 0 Nl/min about 10 minutes later, thus failing to reach 4 Nl/min at any time.

As will be apparent from the experiment described above, the container of the invention is adapted to prevent the temperature reduction of hydrogen absorbing alloy due to the endothermic reaction since the heat of catalytic combustion of hydrogen gas in the heater is supplied to the container. The alloy is maintained at an approximately constant temperature, therefore desorbs hydrogen gas at a stabilized rate and is at least twice as long as the alloy in the conventional container in desorption time.

Embodiment 4b

According to this embodiment, the container 10 is packed with molded bodies 20 of hydrogen absorbing alloy as shown in FIG. 9.

Molded bodies 20, 55 mm in diameter and 10 mm in thickness, were prepared from a powder of the alloy $LaNi_{4.9}Al_{0.1}$ by pressing. The container was packed with 8 molded bodies (total weight 870 g) as stacked up vertically. Some of the molded bodies 20 at the bottom of the container 10 had a through hole 21 formed at the center for inserting a temperature sensor 60 therein.

The hydrogen absorbing alloy within the container was activated, caused to absorb hydrogen and then used for a hydrogen desorption experiment.

For activation, the container was exposed to hot air and thereby heated to about 60° C. for 2 hours while being evacuated.

After the activation, the interior of the container was pressurized with 9 $kg/cm^2$ of hydrogen gas for filling while exposing the container to cold air and cooling the alloy to cause the alloy to absorb the hydrogen gas. The absorption of hydrogen was completed on recognizing that 120 Nl of hydrogen gas had been absorbed by the alloy.

Figure 21:
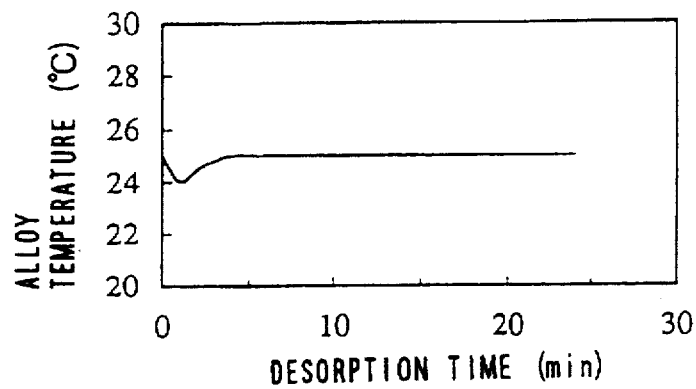
FIG. 21 is a graph showing the relationship between the hydrogen desorption time and the alloy temperature in Embodiment 4b.
Figure 22:
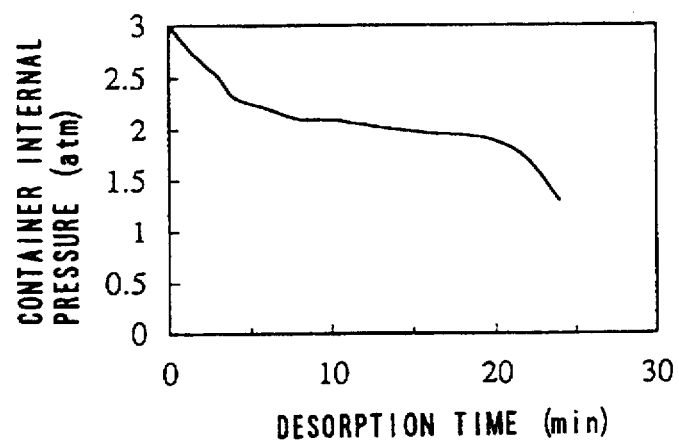
FIG. 22 is a graph showing the relationship between the hydrogen desorption time and the container internal pressure in Embodiment 4b.
Figure 23:
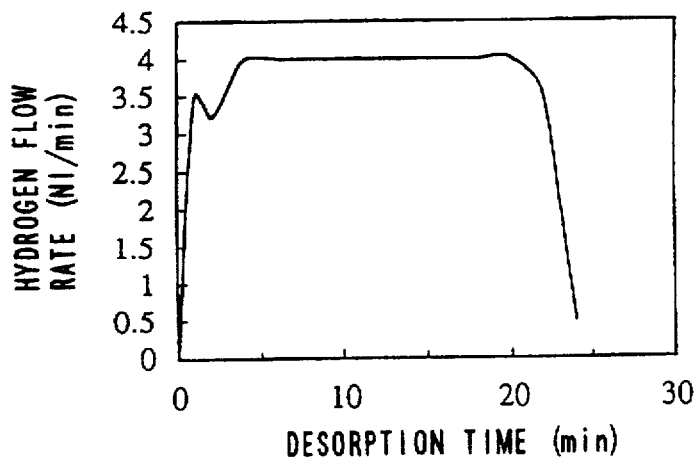
FIG. 23 is a graph showing the relationship between the hydrogen desorption time and the hydrogen flow rate in Embodiment 4b.

The alloy was allowed to desorb the absorbed hydrogen gas at atmospheric temperature of 25° C. The amount of hydrogen to be desorbed was so controlled that the hydrogen gas passed through the stop valve 32 at a rate of about 4 Nl/min, and the alloy temperature, container internal pressure and hydrogen flow rate were measured as related to the hydrogen desorption time. FIGS. 21 to 23 show the results.

FIG. 21 shows that the alloy temperature remains at a stabilized level of 25° C. as predetermined, whereas the alloy temperature in Embodiment 4a was 1° C. lower than the predetermined temperature, i.e., 24° C. (see FIG. 15). This difference is thought attributable to the fact that the molded bodies 20 are greater in heat transfer coefficient. Accordingly, the molded body 20 is advantageous over the powder for use as the hydrogen absorbing alloy in the container.

The container internal pressure and the hydrogen flow rate shown in FIGS. 22 and 23 are comparable to the corresponding results achieved by the container of the invention according to Embodiment 4a. It is seen that the pressure and the flow rate remained as high as about 2 atm and about 4 Nl/min, respectively.

Embodiment 5

Figure 24:
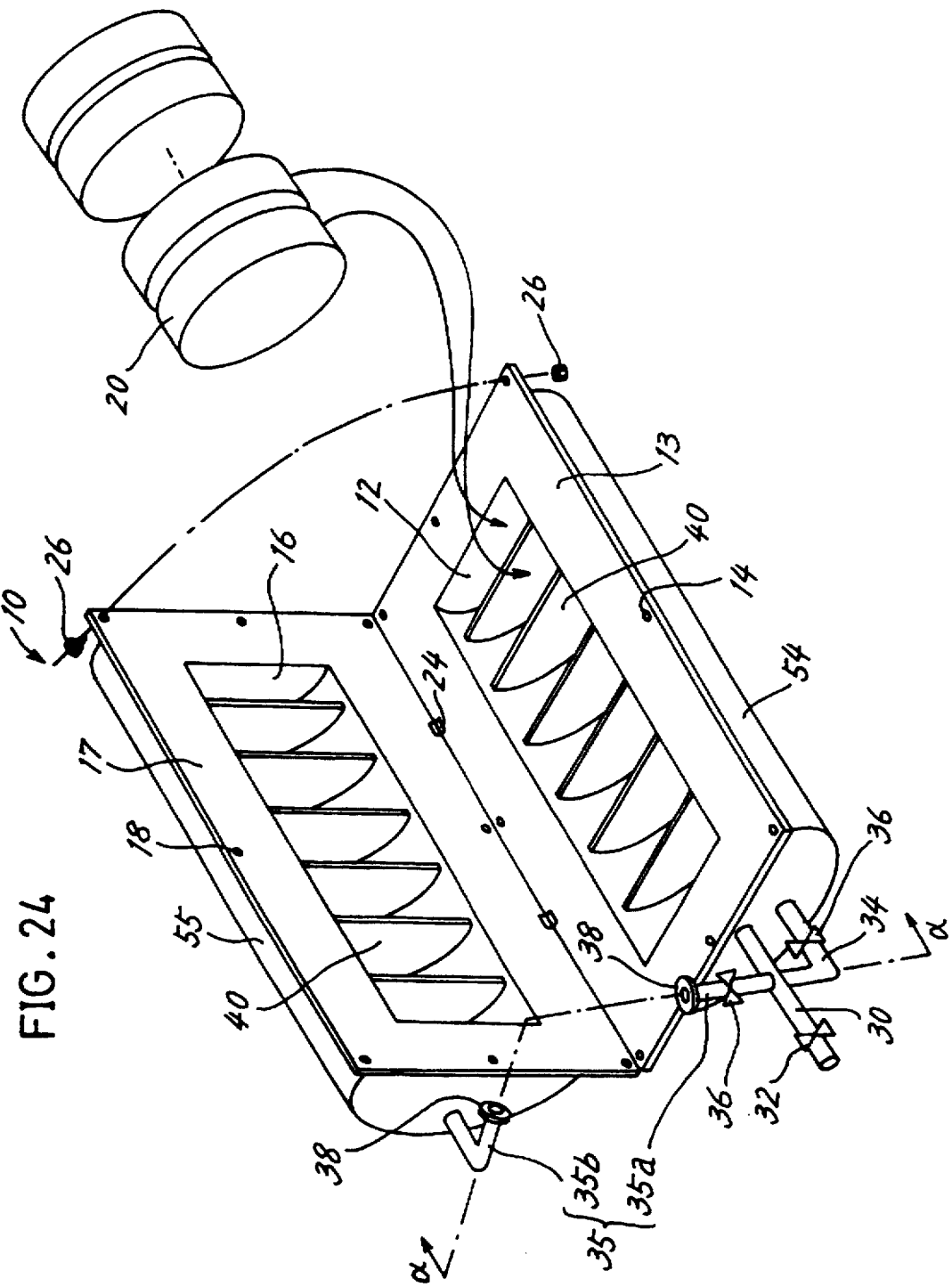
FIG. 24 is a perspective of a hydrogen storage container as Embodiment 5.
Figure 25:
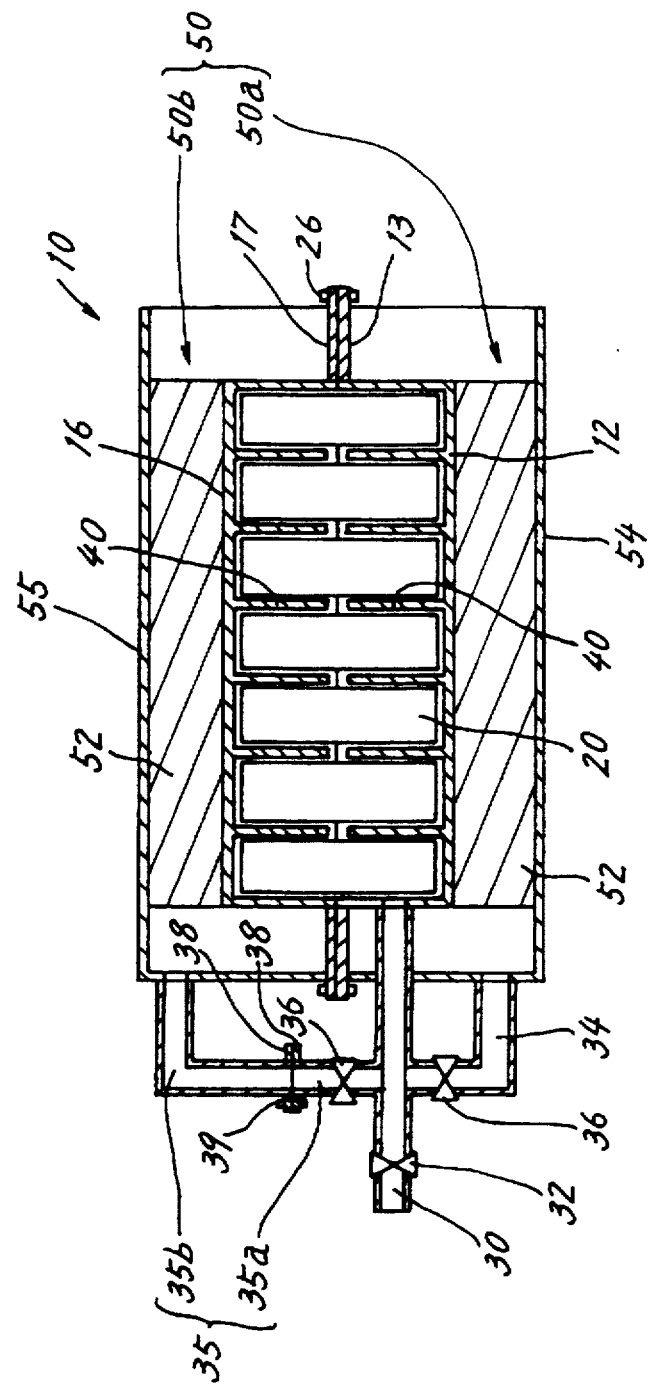
FIG. 25 is a view in section taken along the line α—α in FIG. 24
Figure 26:
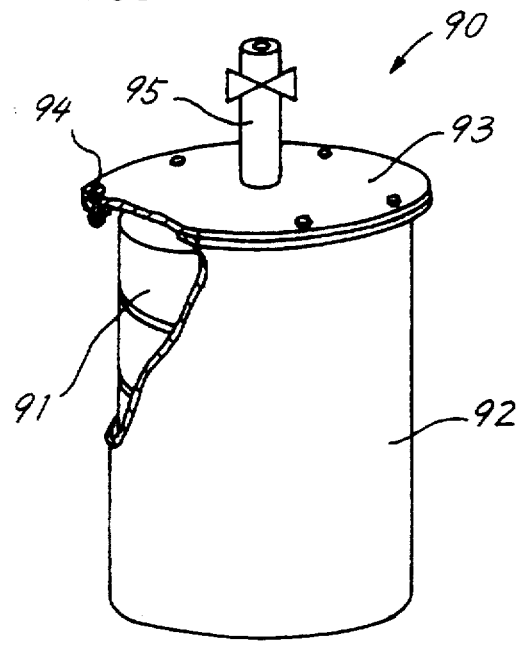
FIG. 26 is a perspective view of a conventional hydrogen storage container.
Figure 27:
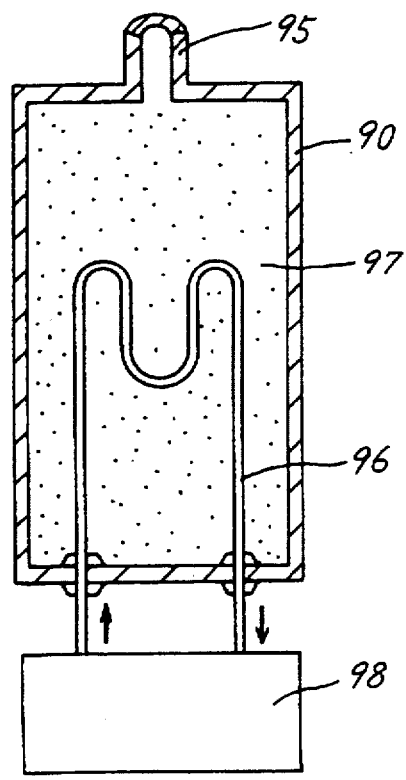
FIG. 27 is a sectional view showing a conventional hydrogen storage container having an external heat source.

This embodiment comprises a dividable hydrogen storage container 10 the same as the one described with reference to Embodiment 2, and a dividable heater 50 similar to the container. FIG. 24 shows the container as opened for the replacement of molded bodies 20, and FIG. 25 is a view in section taken along the line α—α in FIG. 24 and showing the container as closed. Throughout the drawings showing Embodiments 2, 4b and 5, like parts are designated by like reference numerals.

The container 10 is divided into a first segment 12 and a second segment 16 so as to form an opening in a plane containing the central axis of a tubular body.

The peripheral edge portion of the first segment 12 at the opening side thereof and the peripheral edge portion of the second segment 16 at the opening side thereof are formed respectively with flanges 13, 17 having a large width and projecting outward. Opposed side portions of the flanges are pivotably connected together by hinges 24. The flanges 13, 17 are formed close to the outer periphery thereof with respective holes 14, 18 for passing bolts or like fastening members 26 therethrough. Disposed between the flanges 13, 17 is a seal member (not shown) for preventing hydrogen gas from leaking.

In the same manner as in Embodiment 2, each of the first segment 12 and the second segment 16 of the container has a plurality of heat transfer fins 40, with a clearance provided between each pair of opposed fins when the container is closed so as to ensure more efficient heat transfer to the molded bodies to be placed in the container.

Heaters 50a, 50b are arranged around the container 10. The heaters 50a, 50b comprise a catalyst 52 placed in semicylinders 54, 55 surrounding the first segment 12 and the second segment 16, respectively, and attached to the respective flanges 13, 17 of large width close to their peripheral edges in intimate contact therewith. Each of the semicylinders 54, 55 has a radius smaller than ½ of the width of the flanges 13, 17 and is closed at one end and open at the other end. The catalyst 52 is filled in each of the semicylinders 54, 55 with a clearance formed at the closed end as seen in FIG. 25.

The first segment 12 of the container 10 has connected to one end thereof hydrogen piping 30 for passing therethrough the hydrogen gas desorbed from the molded bodies 20. The piping 30 extends through the closed end of the semicylinder 54 to the outside. The flow channel of the piping 30 is provided with a stop valve 32. Between the stop valve 32 and the container 10, two hydrogen channels 34, 35 branch from the piping 30 for supplying hydrogen gas to the respective heaters 50a, 50b.

The hydrogen channel 34 branching from the piping 30 communicates with the heater 50a around the first segment 12 for supplying hydrogen gas to the catalyst 52. The hydrogen channel 34 has a valve 36 as in Embodiment 2.

The other hydrogen channel 35 branching from the piping 30 comprises a piping side channel 35a provided with a valve 36 and a heater side channel 35b in communication with the heater 50b. The heater side channel 35b is connected to the piping side channel 35a in communication therewith when the container 10 is closed to supply hydrogen gas to the heater 50b around the second segment 16. The portions of the heater side channel 35b and the piping side channel 35a are provided with respective flanges 38, 38, which are joined with bolts and nuts 39 when the container is closed to prevent leakage of hydrogen gas.

The container 10 may be provided with a temperature sensor (not shown) as in Embodiment 4b for adjusting the degree of opening of the valves 36 in accordance with the measurement obtained by the temperature sensor.

The molded bodies in the hydrogen storage container 10 of the above construction can be replaced by unfastening the flanges 13, 17 and the flanges 38, 38, rotating the second segment 16 relative to the first segment 12 to open the container 10, taking out the accommodated molded bodies and placing new molded bodies into the first segment 12 between the heat transfer fins 40, 40 as is the case with Embodiment 2.

After the placement of the fresh molded bodies, the second segment 16 is rotated toward the first segment 12 to fit the flanges 13, 17, as well as the flanges 38, 38, to each other in position, and the opposed segments and the opposed flanges are fastened together with the fastening members 26 and the bolts and nuts 39, whereby the container 10 is held closed and the channels 35a, 35b are joined into the hydrogen channel 35 for the second segment.

The hydrogen gas desorbed from the molded bodies flows out from the container 10 into the hydrogen piping 30 and then partly flows into the hydrogen channels 34, 35 dividedly. The hydrogen gas dividedly flowing into the channels 34, 35 is supplied to the heaters 50a, 50b for catalytic combustion to raise the temperature of the molded bodies in the container with the heat of combustion.

The hydrogen storage container of the dividable type equipped with the heater 50 and having the foregoing construction facilitates the replacement of molded bodies and is adapted to maintain the molded bodies within a predetermined temperature range for stabilized supply of hydrogen gas.

The construction of the heater is not limited to that of the above embodiment; the heater may be provided on the first segment only or on the piping side end wall of the container or on the other end wall thereof although the heating effect will be somewhat lower.

The hydrogen channel 35 for the second segment 16 may have such a construction that the piping side channel 35a is connected to the heater side channel 35b with bellows or the like.

Apparently, the present invention can be altered or modified by one skilled in the art without departing from the spirit and scope of the invention. Such alterations and modifications are included within the scope of the invention as set forth in the appended claims.

What is claimed is:

1. A hydrogen storage container for accommodating a plurality of molded bodies of a hydrogen absorbing alloy each having planar faces and arranged as opposed to one another face-to-face, the container being dividable into a first segment and a second segment to provide an opening so that the molded bodies can be placed into or taken out of the container through the opening by being moved in a direction parallel to their planar faces.

2. A hydrogen storage container as defined in claim 1 wherein the first segment and the second segment each have a peripheral edge portion formed with a flange projecting outward, and the first segment and the second segment are fastened together at their flanges with fastening members.

3. A hydrogen storage container as defined in claim 2 wherein the first segment and the second segment are pivotably connected together each at a side portion thereof where the flanges are opposed to each other.

4. A hydrogen storage container as defined in claim 1 wherein heat transfer fins are provided inside the container in parallel to the planar faces of the molded bodies to be accommodated.

5. A hydrogen storage container as defined in claim 1 which is in the form of a tubular body having a circular cross section and is dividable into the first segment and the second segment in a plane containing an axis of the tubular body.

6. A hydrogen storage container as defined in claim 1 which is equipped with a heater comprising a catalyst and provided on an outer wall of the container or in the vicinity of the wall, the heater communicating with the container through a hydrogen channel, so that hydrogen gas desorbed from the hydrogen absorbing alloy as accommodated in the container is partly supplied to the heater through the hydrogen channel to undergo catalytic combustion within the heater.

* * * * *